United States Patent [19]

Arnstein

[11] 4,124,820
[45] Nov. 7, 1978

[54] ASYNCHRONOUS DIGITAL DELAY LINE

[75] Inventor: Walter Arnstein, Saratoga, Calif.

[73] Assignee: American Videonetics Corporation, Sunnyvale, Calif.

[21] Appl. No.: 781,583

[22] Filed: Mar. 28, 1977

Related U.S. Application Data

[62] Division of Ser. No. 618,624, Oct. 1, 1975, abandoned.

[51] Int. Cl.[2] .......................... H03K 3/86; H03K 5/04
[52] U.S. Cl. ...................................... 328/55; 328/61;
328/66; 328/74; 307/266
[58] Field of Search ....................... 328/37, 55, 74, 60,
328/61, 66, 62; 307/266

[56] References Cited

U.S. PATENT DOCUMENTS

| 3,523,252 | 8/1970 | Chikli-Pariente | 328/37 |
| 3,641,371 | 2/1972 | Cartwright | 328/55 X |
| 3,675,049 | 7/1972 | Haven | 328/55 X |

Primary Examiner—John S. Heyman
Attorney, Agent, or Firm—David B. Harrison

[57] ABSTRACT

An asynchronous digital delay line is disclosed for delaying amplitude limited frequency modulated impulses of predetermined constant short duration carrying information on the leading edges. The delay line includes a plurality of digital gates connected in cascade to form a tandem array wherein each gate provides a known increment of delay and at least one of the gates is part of a pulse restoring circuit which regeneratively restores the impulses passing through the line to their original predetermined constant short duration.

5 Claims, 5 Drawing Figures

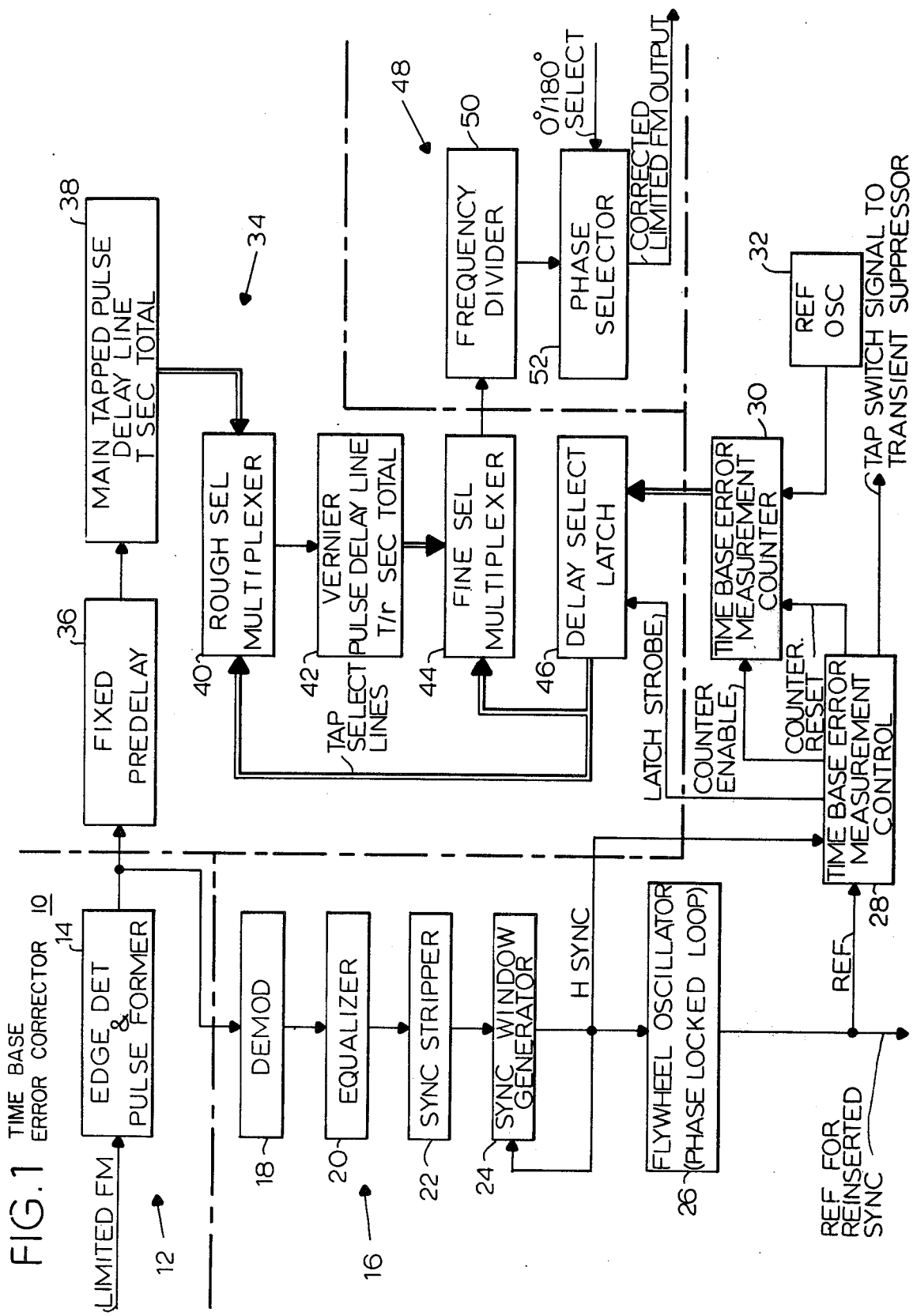
FIG. 1 TIME BASE ERROR CORRECTOR 10

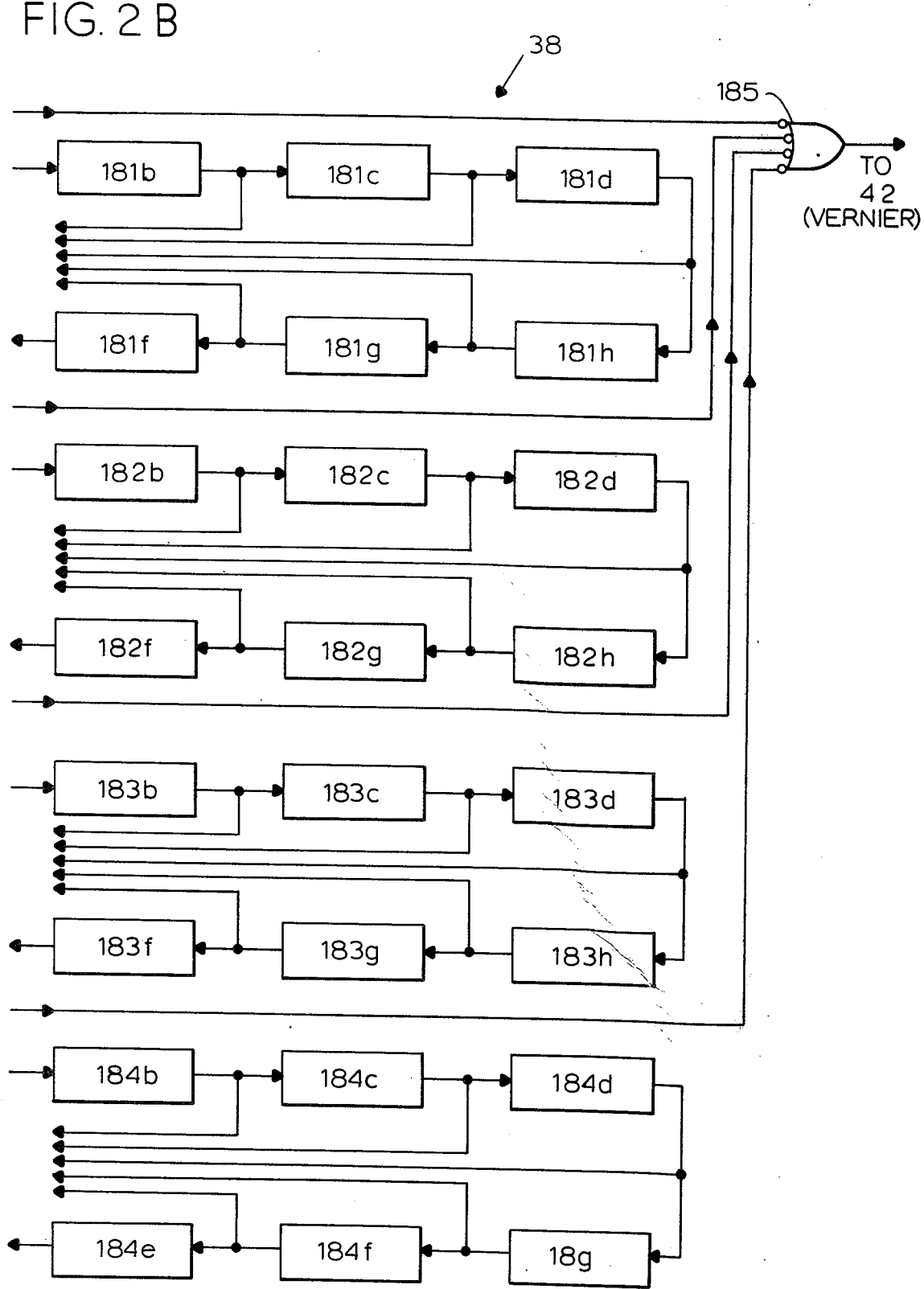

4,124,820

ASYNCHRONOUS DIGITAL DELAY LINE

BACKGROUND OF THE INVENTION

This is a division of Application Ser. No. 618,624 filed Oct. 1, 1975 now abandoned.

The present invention relates to asynchronous digital delay lines. More particularly, the present invention relates to an asynchronous digital delay line for delay of impulses the leading edges of which carry the information, and wherein at least one of the gates also functions to regenerate the impulses to an original predetermined fixed width.

Many forms of delay lines are known in the prior art, including analog lumped-constant delay lines of electrically variable length, and clocked synchronous shift registers. In applications, such as in video time base error correctors of the type disclosed in U.S. Pat. No. 3,860,952 to Tallent et al, the drawbacks of multiple shift registers and other required circuitry for the delay line therein are found in the complexity and expense of implementation of the circuits.

A general object of the present invention is to provide an improved asynchronous digital delay line which effectively utilizes inherent propagation delays in digital circuit elements to provide the increments of delay.

Another object of the present invention is to provide an asynchronous digital delay line formed of a plurality of digital logic gates in tandem which includes in connection with at least one of the gates a pulse regeneration circuit for regenerating the impulses passing through the line to an initial predetermined fixed short duration.

SUMMARY OF THE INVENTION

The asynchronous digital delay line of the present invention operates to delay amplitude frequency modulated impulses of predetermined constant short duration, all information being carried on the leading edges of the impulses. The delay line is formed of a plurality of digital logic gates connected in cascade to form a tandem array. Each gate provides a known increment of delay. At least one of the gates, and preferably several spaced along the length of the array, includes a pulse restoration circuit which regeneratively restores the impulses passing therethrough to their original predetermined constant short duration.

Other objects, advantages and features of the invention will become apparent from the following detailed description of a preferred embodiment, presented with the accompanying drawings.

BRIEF DESCRIPTION OF THE DRAWINGS

FIG. 1 is a functional block diagram of a digital time base error corrector system incorporating the asynchronous digital delay line of the present invention wherein the input subsystem, delay control subsystem, digital delay line subsystem and output subsystem are divided by dashed lines.

FIGS. 2A and 2B constitute a schematic block diagram of the main digital delay line circuit of the delay line subsystem of FIG. 1 and show the interconnection of thirty-one separate hundred nanosecond digital delay cells which make up the main delay line.

DETAILED DESCRIPTION OF A PREFERRED EMBODIMENT

Figure 2A:
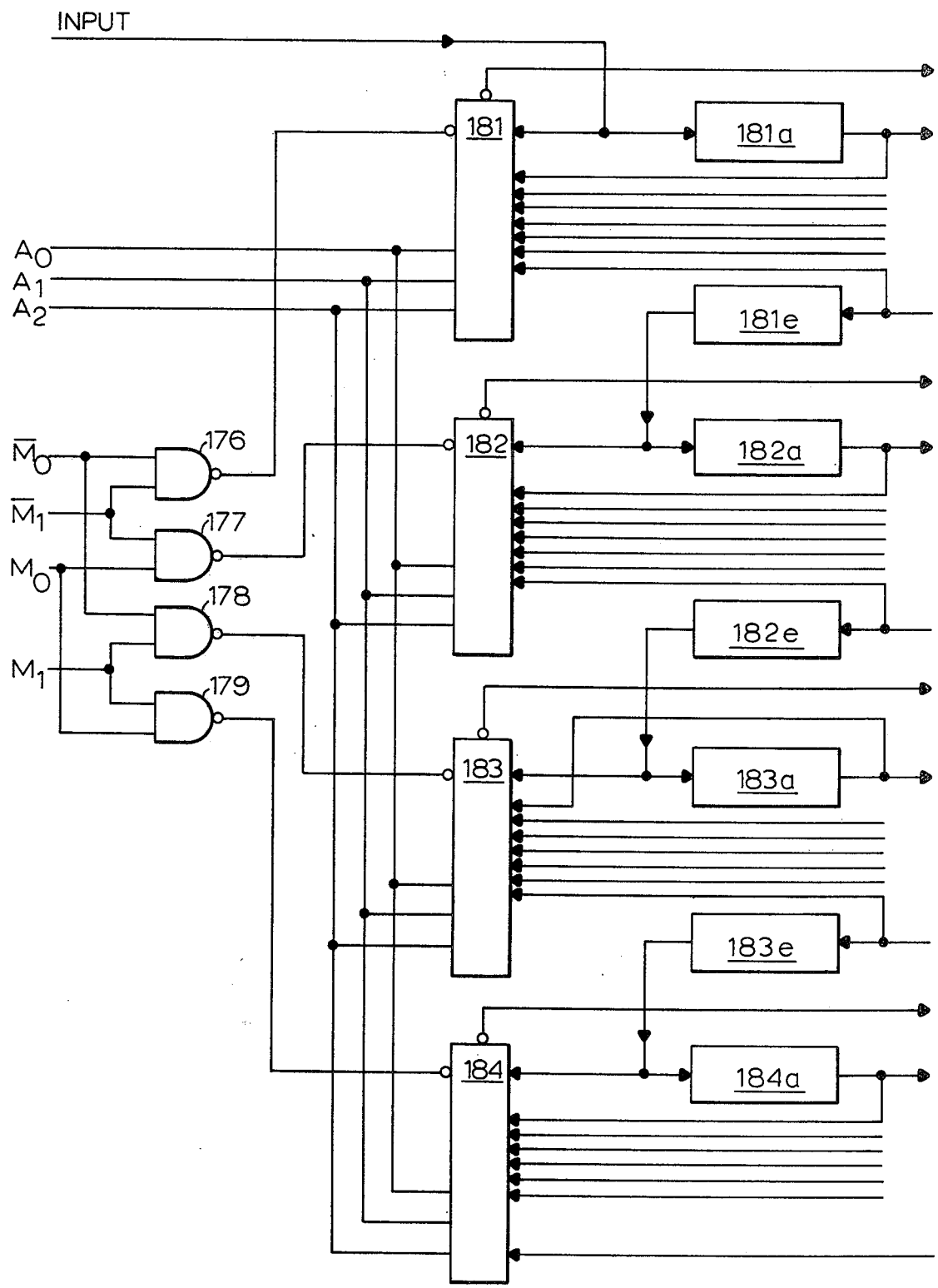

An asynchronous digital delay line 38 constructed in accordance with the principles of the present invention is shown as part of a digital time base error corrector 10 in the block diagram of FIG. 1. Although the present invention relates to the digital delay line, it is shown in one operating environment in the digital time base error corrector. Further details of the time base error corrector may be found in co-pending U.S. Patent Application Ser. No. 804,725, filed June 8, 1977, for Time Base Error Corrector. The error corrector 10 comprises four subsystems: an input subsystem, a delayed control subsystem, a delay line subsystem including the delay line 38 of the present invention and an output subsystem.

The input subsystem 12 provides an edge detector and pulse former which converts an incoming limited FM video line signal into a pulse train of digital pulses of fixed width with a pulse generated at each transition of the limited FM signal.

The delay control subsystem 16 includes eight interconnected circuits: a demodulator 18 connected to the pulse former 14 to recover the direct video signal, an equalizer 20 and sync stripper 22 which separate the synchronizing pulses from the demodulated direct video, and a sync window 24 through which the separated sync pulses are passed to eliminate all but the horizontal sync pulses of the incoming signal. A flywheel oscillator with phase locked loop 26 operates at the horizontal sync rate and is loosely locked to the demodulated incoming horizontal sync to provide an output signal which is an average of the horizontal sync rate. The average horizontal sync rate signal is applied to a time base error measurement control circuit 28 to start the count of a high speed counter 30 which is clocked at 80 megahertz by a stable reference oscillator 32. The average horizontal sync rate signal is advanced ahead of the incoming line of video by a time factor equal to one half of the delay of the main tap delay line 38. The actual horizontal sync pulse from the window 24 is applied to the control circuit 28 to stop the counter 30. The counter 30 is also stopped by a logic circuit that senses when the counter is approaching its maximum count. In this way, the error measurement subsystem cannot overflow or recycle.

While the control system 16 is determining the amount of time base error of the incoming line of video, that line of video has been passing through a fixed predelay circuit 36 of the digital delay line subsystem 34 which delays the video line by the amount of time required by the control system 16. The video line then passes into the main trapped digital delay line 38 of the present invention and out through a tap selected by a rough tap selection multiplexer 40. The line then enters the vernier digital delay line 42 and leaves through a tap selected by a fine tap selection multiplexer 44. The multiplexers 40 and 44 are connected to a delayed tap selector latch 46 which in turn is connected to store the count of the counter 30 when a latch strobe signal is provided by the time base error measurement control signal 28.

Figure 4:
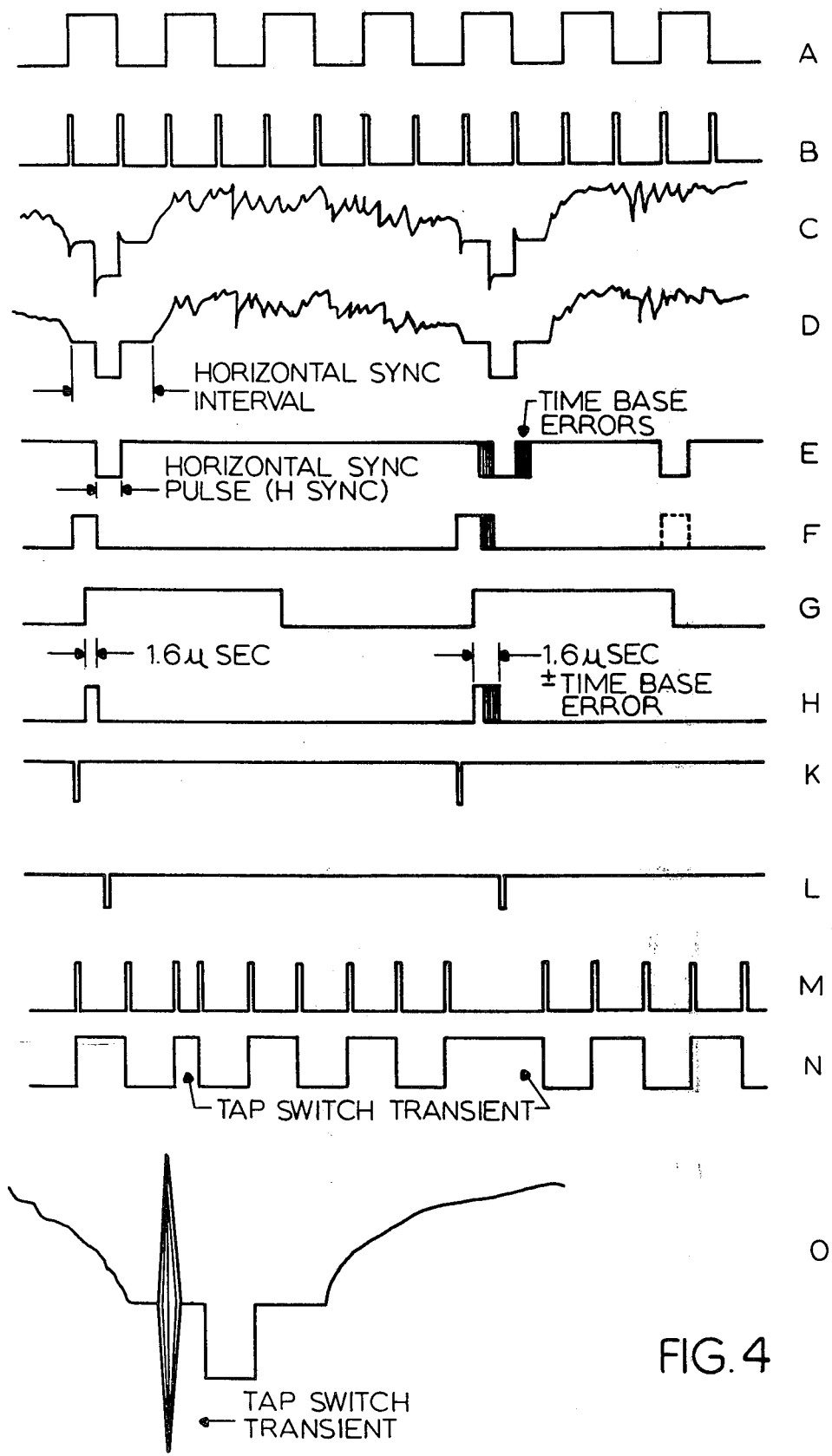
FIG. 4 is a waveform diagram which illustrates operation of the time base error corrector system of FIG. 1.

The time base corrected line of video then enters a frequency divider circuit 50 of the output subsystem 48 where the limited FM format is restored. If needed, a phase selector circuit 52 is included to insure that the output signal is of the correct phase. The input signal to the time base error corrector input subsystem 12 is an amplitude limited frequency modulated video pulse train (shown as waveform A in FIG. 4). This FM video signal is typically provided by the playback electronics subsystem of a video tape recorder although it could be provided from any source of frequency modulated video. If amplitude modulated video information is to be processed by the corrector 10 including delaying passage through the line 38, it is necessary that it first be converted into frequency modulated format. Thus, the input signal at the edge detector and pulse former input subsystem 12 is a pulse train of approximately 50% duty cycle wherein the frequency carries the video signal information. The edge detector and pulse former 14 convert the incoming limited pulse train into constant-width short duration pulses by differentiating the pulse train so that for each positive or negative transition thereof, a positive pulse of approximately 20 nanoseconds in width is produced at the output of the pulse former 14. These pulses are shown as waveform B of FIG. 4. All of the necessary information is carried in the leading edges of the 20 nanosecond pulses, and it is an important consideration in the design of the present system to preserve accurately the relative times of occurrences of these leading edges. In accordance with the principles of the present invention, the asynchronous digital delay line 38 regenerates these pulses so that the relative times of occurrences of the leading edges thereof are preserved accurately.

Turning to FIGS. 2A and 2B, the main tapped pulse delay line 38 and the rough tap selection multiplexer 40 will now be discussed. The latch output signals $M_0$, $\overline{M_0}$, $M_1$ and $\overline{M_1}$ are supplied to four two input NAND gates 176, 177, 178, 179 in accordance with the connection shown in FIG. 2A. These signals are associated with the counter's two bit positions above the lowest three positions. The output of the gate 176 goes to the enable (strobe) input of a first multiplexer 181; the output of the gate 177 goes to the enable input of a second multiplexer 182; the output of the gate 178 goes to the enable input of a third multiplexer 183; and, the output of the gate 179 goes to the enable input of a fourth multiplexer 184. Each of the multiplexers 181, 182, 183, and 184 may be the same type as the multiplexer 44. Thus, the latch output signals $M_0$, $\overline{M_0}$, $M_1$ and $\overline{M_1}$ serve to select one of the four multiplexers 181, 182, 183, or 184. The latch outputs signals $A_0$, $A_1$, and $A_2$ are applied in parallel to the data select inputs of the multiplexers 181, 182, 183 and 184. They are associated with the counter's three highest order bit positions. Thus, the signals $A_0$, $A_1$ and $A_2$ function to select one of eight taps in each of the multiplexers 181, 182, 183, 184. The outputs of the multiplexers 181, 182, 183, 184 provide four inputs to a positive NAND gate 185 (FIG. 2B), the output of which goes to the input of the vernier delay line 42. Since only one multiplexer is enabled at a time, the gate serves as a multiplexer itself and its output is always unambiguous.

The main tapped digital delay line 38 of the preferred embodiment is made up of 31 identical digital delay elements which are connected in series. Each element provides 100 nanoseconds of delay. The undelayed input and the first seven elements 181a, 181b, 181c, 181d, 181f, 181g and 181h, are connected to the first multiplexer 181; the next eight elements 181e, 182a, 182b, 182c, 182d, 182f, 182g and 182h are connected to the second multiplexer 182; the third eight elements 182e, 183a, 183b, 183c, 183d, 183f, 183g and 183h are connected to the third multiplexer 183 and the remaining eight elements 183e, 184a, 184b, 184c 184d, 184e, 184f and 184g are connected to the fourth multiplexer 184. Thus, in combination, the four multiplexers 181, 182, 183, 184 are wired to select on command one of the 32 hundred nanosecond delay elements (including the undelayed input) in accordance with the latch signals received from the delay tap selector latch 46.

Figure 3:
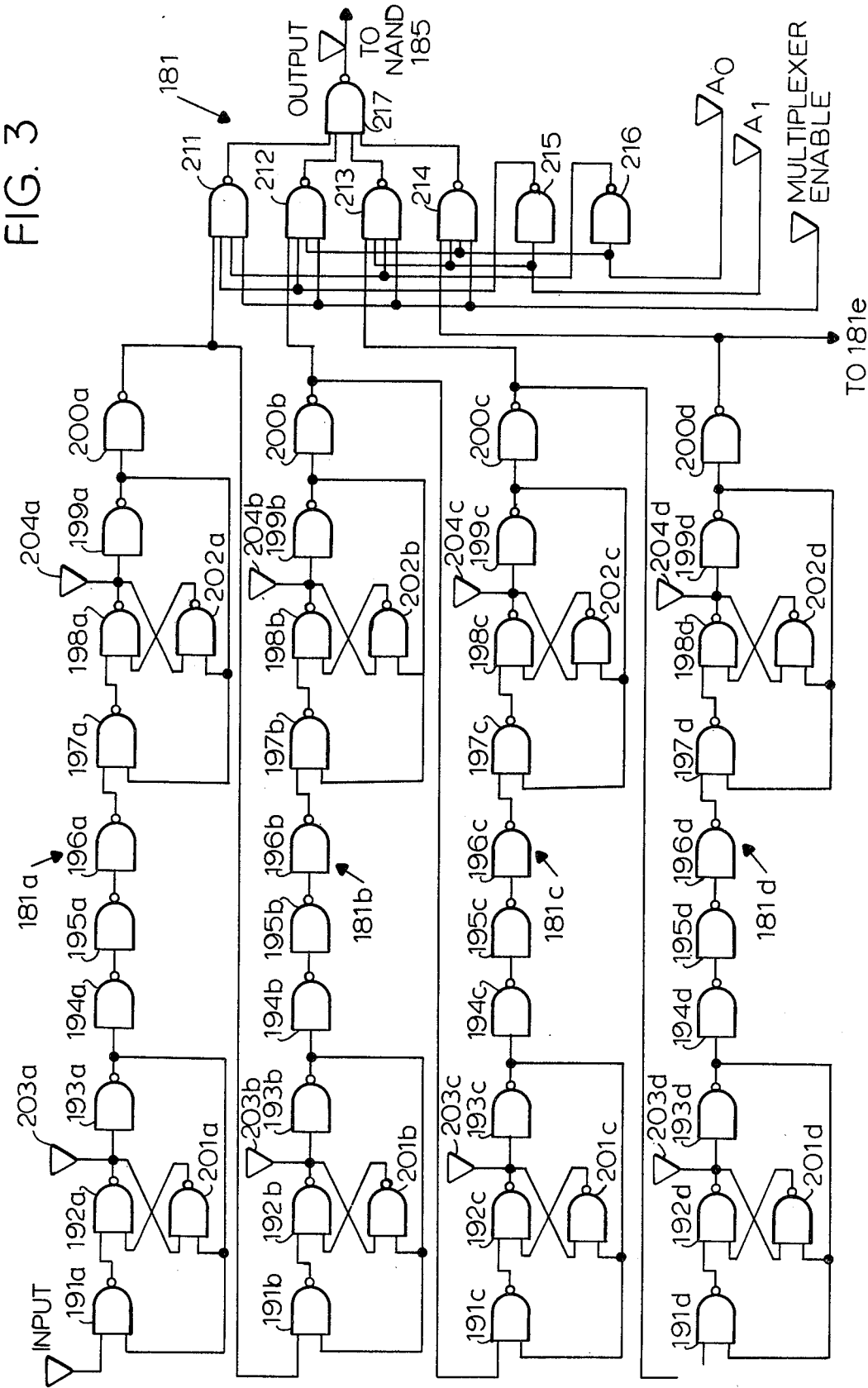
FIG. 3 is a schematic logic symbol diagram of four of the thirty-one interconnected hundred nanosecond digital delay cells shown in FIGS. 2A and 2B with the associated multiplexer tap selector implementation shown by logic symbols.

The circuitry of the first four (181a, 181b, 181c, 181d) of the 31 identical delay elements, along with a portion of the circuitry of the first multiplexer 181 is shown in detail in FIG. 3. Each delay element is made up of a series of digital NAND gates. Each gate may be one of the gates of a type e.g. SN 7400 made by Texas Instruments, Inc., or all of the gates shown in FIG. 3 may be fabricated as a single large scale integrated circuit chip. Thus the element 181a includes the series of gates 191a, 192a, 193a, 194a, 195a, 196a, 197a, 198a, 100a and 202a. Each gate is selected to have a transit time or propagation delay of approximately 10 nanoseconds; thus, the ten gates 191a through 200a provide the 100 nanoseconds of required delay. A gate 201a is latch-connected with the gate 192a, and another gate 202a is latch-connected with the gate 198a. Gates 201a and 202a function to reconstitute each pulse travelling through the delay element 181a in order to overcome propagation losses. Two nodes 203a and 204a are provided for the purpose of adding external timing capacitance or resistance to calibrate the propagation delay of the element 181a to 100 nanoseconds. The description just given to the delay element 181a applies equally to the elements 181b, 181c and 181d which are illustrated in FIG. 3 as well as to the other 27 elements shown in FIGS. 2A and 2B; thus, it will not be repeated for them.

The portion of the first multiplexer 181 shown in FIG. 3 selects one of the delay elements 181a, 181b, 181c or 181d in accordance with the latch signals $A_0$ or $A_1$ ($A_2$ is not shown, but is required by the first multiplexer 181 to select one of all of the eight delay elements it governs). The latch signals $A_0$ and $A_1$ along with the enable signal are applied to four element selector NAND gates 211, 212, 213 and 214. The output of delay element 181a provides a fourth input to a NAND gate 211; the output of element 181b provides a fourth input to a NAND gate 212, the output of element 181c provides a fourth input to a NAND gate 213, and the output of element 181d provides a fourth input to a NAND 214. Internal inverters 215 and 216 provide NOT $A_0$ ($\overline{A_0}$) signals to gates 211 and 213 and NOT $A_1$ ($\overline{A_1}$) signals to gates 211 and 212 respectively. An output gate 217 provides one of the four inputs to the main delay line output NAND gate 185.

It should be noted that inverter 200d provides an output that bypasses the multiplexer and provides for the unobstructed propagation of the pulse train to subsequent delay elements even when the present multiplexer is not enabled. This is the means by which the entire delay line is cascaded.

Operation

Referring to FIG. 1 amplitude limited FM video information is applied to the edge detector and pulse former 14 of the input subsystem 12 to provide an output pulse train of about 20 nanosecond wide pulses, the leading edges of which carry all of the video information. These converted pulses then enter into the fixed predelay circuit 36 and are delayed by approximately 700 nanoseconds. During this 700 nanosecond delay, the formed pulse train from the edge detector and pulse former 14 is demodulated by the demodulator to restore composite direct video which is equalized by the equalizer 20. Thereafter the synchronizing pulses are detected and separated from other video information and are then passed to the time base error measurement control circuit 28 to provide a counter stop signal for the high speed counter 30. The time required for the line of video information to pass through the demodulator 18, equalizer 20, sync stripper 22, sync window 24, and into the time base error measurement control 28 is the same as the time required for the signal to pass through the predelay circuit 36: about 700 nanoseconds. It may be shorter than the latter, but not longer as this would shorten the usable range of the line.

At the same time, the flywheel oscillator 26 is loosely locked at the horizontal sync rate by the phase lock loop circuitry so that the flywheel oscillator 26 provides control signal corresponding to the average horizontal line sync rate and phase. This control signal is supplied to the time base error measurement control circuit 28 to provide a counter enable signal which starts the high speed digital counter counting.

The main tapped digital delay line 38 of the present invention provides for a total of 3.1 microseconds of delay, and the vernier pulse delay line 42 provides the additional 100 nanoseconds, for a total 3.2 microseconds delay line. The high speed measurement counter 30 contains 256 combinations which corresponds to the 256 delay taps provided by the main tapped digital delay line 38 combined with one vernier line 42. At the control signal from the flywheel oscillator 26, the high speed 80 megahertz counter 30 begins to count taps along the delay lines 38 and 42. The counter is stopped by the arrival of the leading edge of the actual incoming horizontal sync pulse as received at the time base error measurement control 28. The count reached by the counter 30 corresponds to the arrival time of the incoming video line while it simultaneously selects the appropriate tap to correct a time base error, if any. After the counter 30 has settled, the count is strobed into the delay tap selector latch 46 by a signal from the time base error measurement control 28. The latch strobe signal is timed to occur during the front porch portion of the horizontal sync interval so that it does not interfere with either the horizontal sync pulse or with video information so that it may be readily suppressed by suitable circuitry. Tap switch transients are illustrated as iregularly timed impulses in waveform M, and irregular pulses in waveform N. The switching transient is illustrated in waveform O of FIG. 4 as occurring during the front porch position of the horizontal sync interval. In such position it may readily be suppressed. In other positions it would interfere with the picture or synchronization.

If there is no time base error, the counter reading will be 128 in binary which indicates the midpoint of the 3.2 microsecond delay line and which provides the 1.6 microsecond delay needed to account for the 1.6 microsecond advance of the reference signal from the flywheel oscillator 26. If the count is less than 128 (which means that the leading edge of the incoming horizontal sync pulse came sooner than expected and more delay is needed for correction) a tap closer to the end of the delay line than the midpoint will be selected. If the count is greater than 128 (which would indicate that the leading edge of the incoming horizontal sync pulse was late and that less delay is needed for correction) a tap closer to the beginning of the delay line will be selected. Once the taps on the main tap digital delay line 38 and the vernier delay line 42 have been made, they remain in place for the duration of the passage of the incoming television line of video through the delay 34 and output 48 subsystem. During this passage, and in particular during the front porch at the end of said line, the delay needed for the next video line will be counted by the counter 30 in the manner aforesaid.

In the embodiment shown in FIG. 1, the line of video leaves the fixed predelay circuit 36, passes through the main tapped digital delay line 38 and exits therefrom at the tap selected, enters the rough tap selection multiplexer 40 and exits therefrom, to the vernier pulse delay line 42 and exits therefrom via the tap selected. The line of video then passes through the fine selector multiplexer 44 and into the frequency divider where the line of video is integrated into limited FM wherein the time base error has been corrected. A phase selector 52 provides the correct phase relationship of the final signal.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An asynchronous digital delay line for delaying amplitude limited frequency modulated impulses of predetermined constant short duration carrying information on the leading edges thereof comprising a plurality of digital gates connected in cascade to form a tandem array wherein each gate provides a known increment of delay and wherein at least one of said gates additionally comprises pulse restoration means for regenerating said impulses passing through said delay line to be of said predetermined constant short duration.

2. An asynchronous digital delay line for delaying amplitude limited frequency modulated pulses carrying all information on the leading edges thereof comprising a plurality of digital gates connected in cascade to form a tandem array through which said impulses pass by self-clocking and wherein each gate provides a known increment of delay and further including at least one said gate thereof comprising pulse restoration means having a connection to an output of a following gate for regenerating each said impulse passing therethrough to be of said predetermined short duration.

3. A tapped digital delay line for delaying amplitude limited frequency modulated pulses wherein all information is contained on the leading edges of said pulses of a continuously connected plurality of delay elements with taps therebetween each element providing an increment of delay and comprising a plurality of digital gates connected in series including within said series a first two input NAND gate having a first input connected to receive said pulses and having a second input and an output; a second two input NAND gate having a first input connected to said output of said first gate and a second input and an output; an inverter gate having an input connected to said output of said second gate and an output connected to another of said gates in said series; a third two input NAND gate having a first input connected to said output of said second gate, a second input connected to said output of said inverter gate and to said second input of said first gate and an output connected to said second input of said second gate; and further comprising multiplexer means connected to said taps for selecting one of said taps in response to a tap selection control signal provided for controlling the delay length of said tapped digital delay lines.

4. An asynchronous digital delay line for delaying amplitude limited frequency modulated pulses carrying all information on the leading edges thereof comprising a plurality of digital gates connected in cascade to form a tandem array through which said impulses pass by self clocking and wherein each gate provides a known increment of delay and wherein at least one said gate thereof comprises a part of a latch connected flip flop, the input to said gate being a set input of said flip flop and a reset input thereof being provided by a reset connection from an output of another said gate of said array following said one said gate, said flip flop for regenerating said impulses passing through said delay line to be of said predetermined constant short duration.

5. The asynchronous digital delay line set forth in claim 4 wherein said reset connection is also connected to an input of a gate of said array immediately preceding said one gate comprising a part of said flip flop.

* * * * *

UNITED STATES PATENT AND TRADEMARK OFFICE
CERTIFICATE OF CORRECTION

PATENT NO. : 4,124,820
DATED : November 7, 1978
INVENTOR(S) : WALTER ARNSTEIN

It is certified that error appears in the above-identified patent and that said Letters Patent are hereby corrected as shown below:

Col. 4, line 52 "$(A_0)$" should read --$(\overline{A_0})$--, and "$(A_1)$" should read --$(\overline{A_1})$--.

Signed and Sealed this

Twelfth Day of June 1979

[SEAL]

Attest:

RUTH C. MASON
*Attesting Officer*

DONALD W. BANNER
*Commissioner of Patents and Trademarks*